US010657325B2

(12) United States Patent
Liu

(10) Patent No.: US 10,657,325 B2
(45) Date of Patent: May 19, 2020

(54) METHOD FOR PARSING QUERY BASED ON ARTIFICIAL INTELLIGENCE AND COMPUTER DEVICE

(71) Applicant: BEIJING BAIDU NETCOM SCIENCE AND TECHNOLOGY CO., LTD., Beijing (CN)

(72) Inventor: Qiongqiong Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 316 days.

(21) Appl. No.: 15/875,453

(22) Filed: Jan. 19, 2018

(65) Prior Publication Data

US 2018/0373692 A1    Dec. 27, 2018

(30) Foreign Application Priority Data

Jun. 21, 2017    (CN) .......................... 2017 1 0475689

(51) Int. Cl.
*G06F 40/205* (2020.01)
*G06N 5/02* (2006.01)
(Continued)

(52) U.S. Cl.
CPC ...... *G06F 40/205* (2020.01); *G06F 16/90335* (2019.01); *G06N 5/003* (2013.01);
(Continued)

(58) Field of Classification Search
CPC ............... G06F 40/205; G06F 40/242; G06F 16/90335; G06N 20/20; G06N 5/003; G06N 5/022
See application file for complete search history.

(56) References Cited

U.S. PATENT DOCUMENTS 8,463,782 B1* 6/2013 Upstill ................... G06F 40/20
707/736
2009/0112832 A1* 4/2009 Kandogan ............. G06Q 10/10
(Continued)

FOREIGN PATENT DOCUMENTS

CN    102810117    12/2012
CN    105224622    1/2016
CN    105843850    8/2016

OTHER PUBLICATIONS

Sun, "Search Information Analytic Method Based on Artificial Intelligence," Peak Data Science, 2017, vol. 6, No. 7, pp. 31-32.
(Continued)

*Primary Examiner* — Irete F Ehichioya
*Assistant Examiner* — Antonio J Caiado
(74) *Attorney, Agent, or Firm* — Hodgson Russ LLP

(57) ABSTRACT

A method for parsing a query based on artificial intelligence, a computer device and a computer program product are provided. The method may include: acquiring annotated data including an annotated search instance, an annotated template instance, a field of a search intent and a category in the field, an attribute of a term in the annotated search instance and a concrete term included in the attribute; performing a training on the annotated data so as to generate an instance dictionary, a template dictionary and an inverted index dictionary; acquiring a target query to be identified; and parsing the target query based on the instance dictionary, the template dictionary and the inverted index dictionary, so as to acquire a target parsing result corresponding to the target query.

18 Claims, 9 Drawing Sheets

(51) Int. Cl.
  *G06F 16/903* (2019.01)
  *G06N 5/00* (2006.01)
  *G06N 20/20* (2019.01)
  *G06F 40/242* (2020.01)
(52) U.S. Cl.
  CPC ............ *G06N 5/022* (2013.01); *G06N 20/20* (2019.01); *G06F 40/242* (2020.01)

(56) References Cited

U.S. PATENT DOCUMENTS

2016/0179945 A1* 6/2016 Lastra Diaz ...... G06F 16/24522 707/739
2018/0307776 A1* 10/2018 Ferradini ............ G06F 16/9577

OTHER PUBLICATIONS

SIPO, First Office Action for CN Application No. 201710475689.7, dated Jan. 21, 2020.

* cited by examiner

METHOD FOR PARSING QUERY BASED ON ARTIFICIAL INTELLIGENCE AND COMPUTER DEVICE

CROSS-REFERENCE TO RELATED APPLICATIONS

This application is based on and claims priority of Chinese Patent Application No. 201710475689.7, filed on Jun. 21, 2017, the entire contents of which are incorporated herein by reference.

FIELD

The present disclosure relates to an information processing field, and more particularly to a method for parsing a query based on artificial intelligence and a computer device.

BACKGROUND

Artificial intelligence (AI for short) is a new technology for studying and developing theories, methods, technologies and application systems for simulating and extending human intelligence. AI is a branch of computer science, intending to know essence of intelligence and to produce an intelligent machine acting in a way similar to that of human intelligence. Researches on the AI field refer to robots, speech recognition, image recognition, natural language processing and expert systems etc.

Professionals in related arts may be needed to participate in an existing process of parsing a query. For example, parsing templates manually-edited by the professionals may be used to parse the query. For another example, segments in the query may be identified manually or automatically, and the query can be parsed based on the identified segments. For another example, the query may be parsed by using a formalized language model. However, the above methods may cause a problem of losing information in the formalized language, and professionals need to participate in the above methods for parsing the query, which may cost massive manual labor and time.

SUMMARY

Embodiments of the present disclosure seek to solve at least one of the problems existing in the related art to at least some extent.

Accordingly, a first objective of the present disclosure is to provide a method for parsing a query based on artificial intelligence.

A second objective of the present disclosure is to provide an apparatus for parsing a query based on artificial intelligence.

A third objective of the present disclosure is to provide a computer device.

A fourth objective of the present disclosure is to provide a computer program product.

A fifth objective of the present disclosure is to provide a non-transitory computer readable storage medium.

In order to achieve the above objectives, embodiments of a first aspect of the present disclosure provide a method for parsing a query based on artificial intelligence. The method includes: acquiring annotated data including an annotated search instance, an annotated template instance, a field of a search intent and a category in the field, an attribute of a term in the annotated search instance and a concrete term included in the attribute of the term; performing a training on the annotated data so as to generate an instance dictionary, a template dictionary and an inverted index dictionary, in which the instance dictionary includes the annotated search instance and an annotation of the annotated search instance, the template dictionary includes a combination of the field, the category and/or the attribute of the term, and the inverted index dictionary includes a corresponding relation between a segmented term and the annotated search instance; acquiring a target query to be identified; and parsing the target query based on the instance dictionary, the template dictionary and the inverted index dictionary, so as to acquire a target parsing result corresponding to the target query.

In order to achieve the above objectives, embodiments of a second aspect of the present disclosure provide an apparatus for parsing a query based on artificial intelligence. The apparatus may include: a first acquiring module, configured to acquire annotated data including an annotated search instance, an annotated template instance, a field of a search intent and a category in the field, an attribute of a term in the annotated search instance and a concrete term included in the attribute of the term; a dictionary generating module, configured to perform a training on the annotated data so as to generate an instance dictionary, a template dictionary and an inverted index dictionary, in which the instance dictionary includes the annotated search instance and an annotation of the annotated search instance, the template dictionary includes a combination of the field, the category and/or the attribute of the term, and the inverted index dictionary includes a corresponding relation between a segmented term and the annotated search instance; a second acquiring module, configured to acquire a target query to be identified; and a parsing module, configured to parse the target query based on the instance dictionary, the template dictionary and the inverted index dictionary, so as to acquire a target parsing result corresponding to the target query.

In order to achieve the above objectives, embodiments of a third aspect of the present disclosure provide a computer device, including: a processor; and a memory configured to store executable program codes; in which the processor is configured to run a program corresponding to the executable program codes by reading the executable program codes stored in the memory, so as to execute the method according to the embodiments of the first aspect of the present disclosure.

In order to achieve the above objectives, embodiments of a fourth aspect of the present disclosure provide a computer program product, when instructions stored in the computer program product are executed, the method according to the embodiments of the first aspect of the present disclosure is performed.

In order to achieve the above objectives, embodiments of a fifth aspect of the present disclosure provide a non-transitory computer readable storage medium storing computer programs, when the computer programs are executed, the method according to the embodiments of the first aspect of the present disclosure is performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
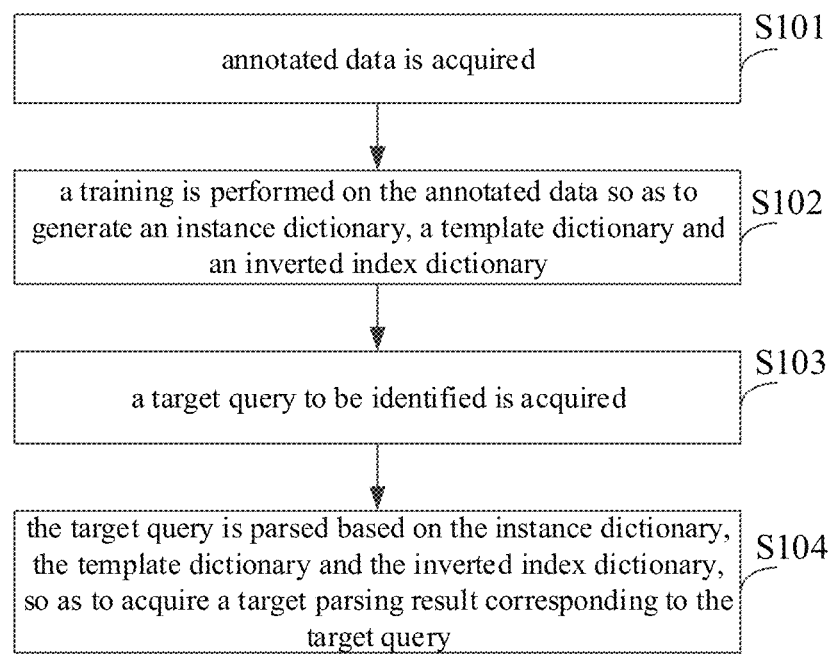
FIG. 1 is a flow chart of a method for parsing a query based on artificial intelligence according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the following, a method and an apparatus for parsing a query based on artificial intelligence according to embodiments of the present disclosure will be described with reference to accompanying drawings.

FIG. 1 is a flow chart of a method for parsing a query based on artificial intelligence according to an embodiment of the present disclosure.

Referring to FIG. 1, the method may include followings.

At block S101, annotated data is acquired.

The annotated data may include an annotated search instance, an annotated template instance, a field of a search intent and a category in the field, an attribute of a term in the annotated search instance and a concrete term included in the attribute.

In this embodiment, a user may determine a field of an item according to the search intent, and annotate a query with a field corresponding to a search intent. Generally, one field may include a plurality of categories which may also be annotated by the user. For example, fields corresponding to the search intent may include: weather, food, films and the like. The field "food" may include categories including cuisines such as Shandong cuisine, Sichuan cuisine, Guangdong cuisine etc. and species such as hot pot, barbecue, buffet etc. The field of "weather" may include weather conditions such as overcast, cloudy, sunny, snowy etc. Generally, when the user checks on the weather, the user may input a query including a location and a time. Thus, "loc" and "time" may be regarded as attributes of a term, and some concrete terms may be set for each attribute. For example, the attribute "loc" may be annotated with a concrete term such as "Beijing", "Shanghai", "Shenzhen", "Tianjin" and the like. The attribute "time" may be annotated with a concrete term such as "today", "tomorrow" and the like.

In this embodiment, the user may analyze a search instance, and annotate it with the field of the search intent corresponding to the search instance and attributes of terms related to the search instance. For example, when the search instance is "weather in Beijing today", after annotating this search instance, a piece of annotated data "weather in Beijing today; WEATHERINFO sys_loc: Beijing, sys_time: today" may be acquired. For another example, when the search instance is "is it going to rain today?", after annotating this search instance, a piece of annotated data "is it going to rain today? SYS_RAIN sys_time: today" may be acquired.

In this embodiment, the user may generate and annotate some template instances. For example, "is it going to rain sometime somewhere" may be regarded as a template instance, in which the attribute of "somewhere" is "loc", and the attribute of "sometime" is "time". The term "rain" is a category under the field of "weather", and the template instance may be annotated to form a piece of annotated data "[D: sys_loc][D: sys_time] is it going to rain SYS_RAIN". It should be noted that the user may set a template instance to annotate as required. For example, a template instance may be annotated as "[D: sys_loc][D: sys_time] weather WEATHERINFO". The above examples should not be considered to limit the present disclosure. In addition, it should be noted that a template may be generated automatically according to the annotated search instance, which will be described in detail as follows.

After the above mentioned processing, the annotated data may be acquired. The annotated search instance, the annotated template instance, the field of the search intent and the category in the field, the attribute of the term in the annotated search instance and the concrete term included in the attribute are included in the annotated data.

For example, when checking on the weather, following annotated data may be acquired.

---

Schema
Intent: WEATHERINFO|SYS_RAIN
Slots: sys_loc=Beijing|Shanghai......
 sys_time=today|tommorow
annotated instances
weather in Beijing today; WEATHERINFO sys_loc: Beijing, sys_time: today
Is it going to rain today? SYS_RAIN sys_time: today
[D : sys_loc][D : sys_time] is it going to rain? SYS_RAIN

---

It should be noted that, WEATHERINFO represents the field, SYS_RAIN represents the category in such field, sys_loc and sys_time represent attributes of terms respectively, Beijing|Shanghai represent concrete terms in the attribute "sys_loc", and today|tommorow represent concrete terms in the attribute "sys_time". "weather in Beijing today; WEATHERINFO sys_loc: Beijing, sys_time: today" and "Is it going to rain today? SYS_RAIN sys_time: today" are annotated search instances. "[D: sys_loc][D: sys_time] is it going to rain? SYS_RAIN" is an annotated template instance.

It should be noted that the above mentioned annotated data are merely examples, which should not be considered as limitations on the present disclosure.

At block S102, a training is performed on the annotated data so as to generate an instance dictionary, a template dictionary and an inverted index dictionary.

The instance dictionary includes the annotated search instance and an annotation of the annotated search instance, the template dictionary includes a combination of the field, the category and/or the attribute, and the inverted index dictionary includes a corresponding relation between a segmented term and the annotated search instance.

After the annotated data is acquired, a training may be performed on the annotated data. The training may be performed offline to save energy. In the training process, the annotated search instance may be extracted from the annotated data, the annotated search instance may be used to generate the instance dictionary. Further, the annotated template instance may be extracted from the annotated data, and the annotated template instance may be used to generate the template dictionary. Further, the annotated template instance may be combined with the annotated search instance, and the inverted index dictionary may be generated based on inverted index processing technology.

At block S103, a target query to be identified is acquired.

The User may input a new query in a search engine, a browser, a webpage or an application according to his/her search intent. The new query is the target query to be identified.

At block S104, the target query is parsed based on the instance dictionary, the template dictionary and the inverted index dictionary, so as to acquire a target parsing result corresponding to the target query.

Specifically, priorities may be set for the instance dictionary, the template dictionary and the inverted index dictionary, the target parsing result of the target query may be acquired by matching in the three dictionaries according to the priorities successively. Preferably, the priorities may be set for the three dictionaries according to parsing accuracies of the three dictionaries. In other words, the higher the parsing accuracy is, the higher the priority is. For example, if the parsing accuracy of the instance dictionary is the highest among the three dictionaries, the priority of the instance dictionary may be set as the highest level.

In a process of parsing the target query, the three dictionaries are used successively to parse the target query according to the priorities set for the three dictionaries. When the target parsing result is acquired by using a target dictionary in the three dictionaries, the parsing by using a next dictionary may be stopped. For example, if the priorities set for the three dictionaries indicate "instance dictionary>template dictionary>inverted index dictionary", the instance dictionary may be used firstly to parse the target query, and if the target parsing result is acquired, the parsing by using the template dictionary may be stopped; if the target parsing result fails to be acquired, the parsing may be performed continuously by using the template dictionary, and if the target parsing result is acquired by using the template dictionary, the parsing by using the inverted index dictionary may be stopped; if the target parsing result fails to be acquired by using the template dictionary, the parsing may be performed continuously by using the inverted index dictionary.

With the method for parsing the query based on artificial intelligence according to the embodiments of the present disclosure, by acquiring the annotated data and performing an off-line training on the annotated data, the instance dictionary, the template dictionary and the inverted index dictionary are generated for parsing the query. During the parting on the query, it only needs to depend on the three dictionaries without professional experiences, such that the query may be parsed automatically. And the parsing on the query using such three dictionaries is an overall parsing, thereby avoiding a problem of data losing. As all the three dictionaries may provide the parsing result of the query, the three dictionaries may be used successively to parse the query to acquire the parsing result, such that a possibility of identifying the query may be improved.

Figure 2:
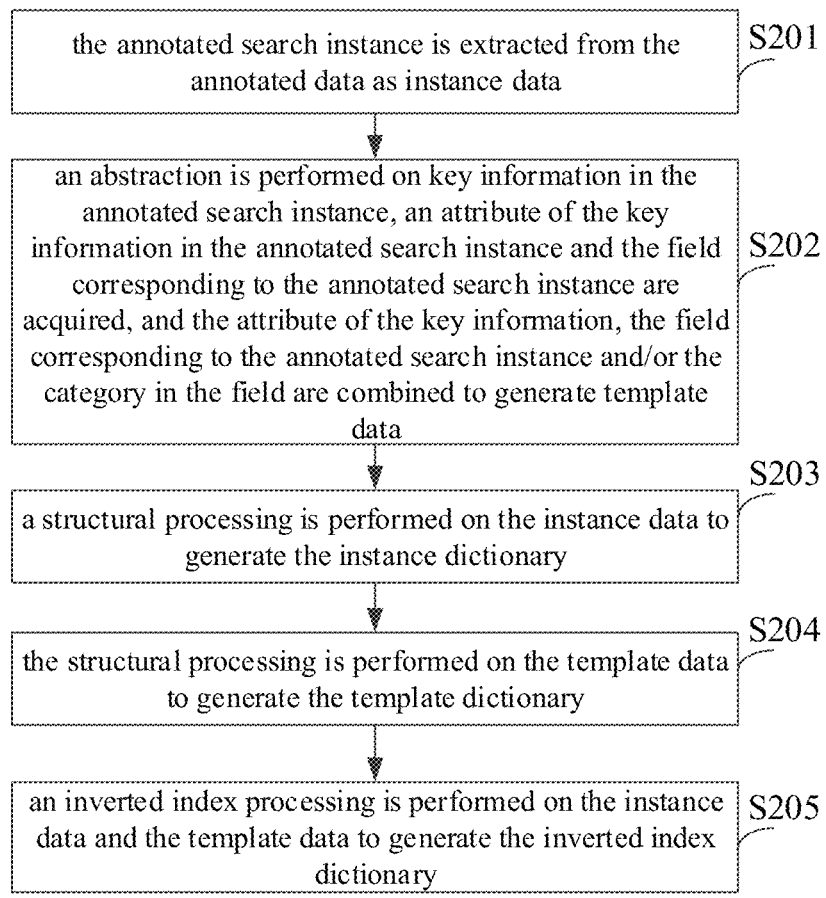
FIG. 2 is a flow chart of a process of training annotated data and generating an instance dictionary, a template dictionary and an inverted index dictionary according to an embodiment of the present disclosure.

In order to clearly describe the method for parsing a query based on artificial intelligence according to the above embodiments of the present disclosure, FIG. 2 illustrates a flow chart of a process of training annotated data and generating an instance dictionary, a template dictionary and an inverted index dictionary according to an embodiment of the present disclosure. As shown in FIG. 2, performing a training on the annotated data so as to generate an instance dictionary, a template dictionary and an inverted index dictionary may include followings.

At block S201, the annotated search instance is extracted from the annotated data as instance data.

After the annotated data is acquired, essential contents of the annotated data may be analyzed in an offline training process, such that the annotated search instance may be identified therefrom and regarded as instance data. In the case of weather checking mentioned above, the instance data may be "weather in Beijing today; WEATHERINFO sys_loc: Beijing, sys_time: today" and "is it going to rain today? SYS_RAIN sys_time: today".

At block S202, an abstraction is performed on key information in the annotated search instance, an attribute of the key information in the annotated search instance and the field corresponding to the annotated search instance are acquired, and the attribute of the key information, the field corresponding to the annotated search instance and/or the category in the field are combined to generate template data.

Specifically, a segmentation may be performed on the annotated search instance to acquire the key information in the annotated search instance. Further, an abstraction and a classification are performed on the key information to acquire the attribute of the key information. For example, after the segmentation is performed on "weather in Beijing today; WEATHERINFO sys_loc: Beijing, sys_time: today", the key information "Beijing" and "today" may be acquired. When the abstraction and the classification are performed on the key information, the attribute of the key information may be analyzed. The attribute of "Beijing" is "loc", and the attribute of "today" is "time".

Further, the field of the query may be determined according to the annotated search instance. For example, the field of the query may be determined as "WEATHERINFO" according to the segmented term "weather".

After all attributes of the key information of the search instance are determined, the template data may be generated by combining the attributes, the field and/or the category in the field. The process for generating the template data is performed automatically, without establishing and annotating the template instance by the user.

Figure 3:
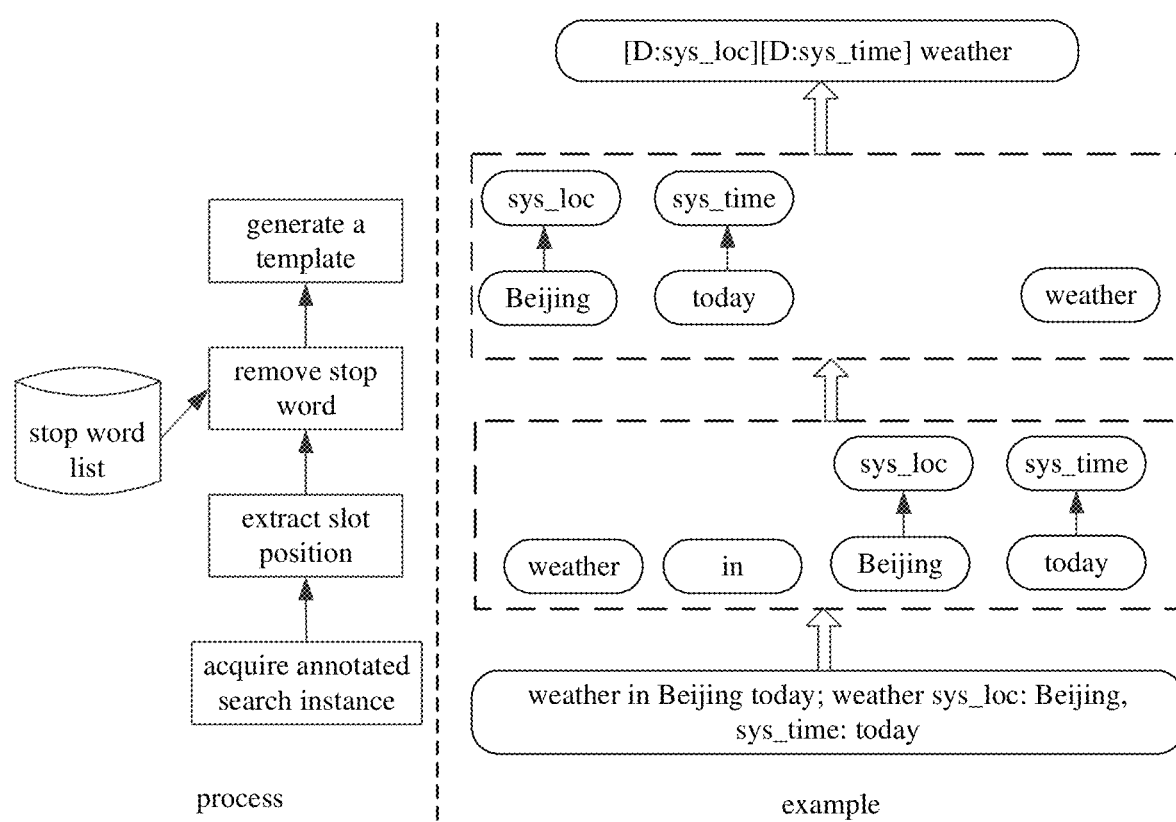
FIG. 3 is a schematic diagram of a process of generating template data according to an embodiment of the present disclosure.

As a possible implementation, FIG. 3 provides a schematic diagram of a process of generating template data according to an embodiment of the present disclosure.

Firstly, a slot position of the annotated search instance may be extracted, in which the slot position refers to the key information in the search instance. After that, stop words are removed from the key information by using a stop word list, and the abstraction is performed on all the key information in the search instance, so as to acquire attributes of the key information and the field corresponding to the search instance, such that template data is generated by combining the attributes, the field and/or the category in the field. The left diagram in FIG. 3 illustrates a process for generating the template data, and the right diagram in FIG. 3 illustrates a specific example After the segmentation is performed on "weather in Beijing today; WEATHERINFO sys_loc: Beijing, sys_time: today", segmented terms including "Beijing", "today", "in" and "weather" may be acquired, in which the attribute of "Beijing" is "sys_loc", and the attribute of "today" is "sys_time". After the segmentation is performed, a template "[D: sys_loc][D: sys_time] weather" may be generated finally.

At block S203, a structural processing is performed on the instance data to generate the instance dictionary.

In order to make the instance dictionary has universality, the structural processing may be performed on all kinds of instance data to obtain the instance dictionary in conformity with a certain rule. For example, the text expression of the instance data may be converted into a binary representation, so as to generate the instance dictionary.

At block S204, the structural processing is performed on the template data to generate the template dictionary.

In order to make the template dictionary has universality, the structural processing may be performed on all kinds of template data to obtain the template dictionary in conformity with a certain rule. For example, the text expression of the template data may be converted into a binary representation, so as to generate the template dictionary.

At block S205, an inverted index processing is performed on the instance data and the template data to generate the inverted index dictionary.

After the segmentation is performed based on the instance data and the template data, an inverted index algorithm may be used to generate the inverted index dictionary. Mapping relations between the segmented terms and the annotated search instances may be included in the inverted index dictionary.

Figure 4:
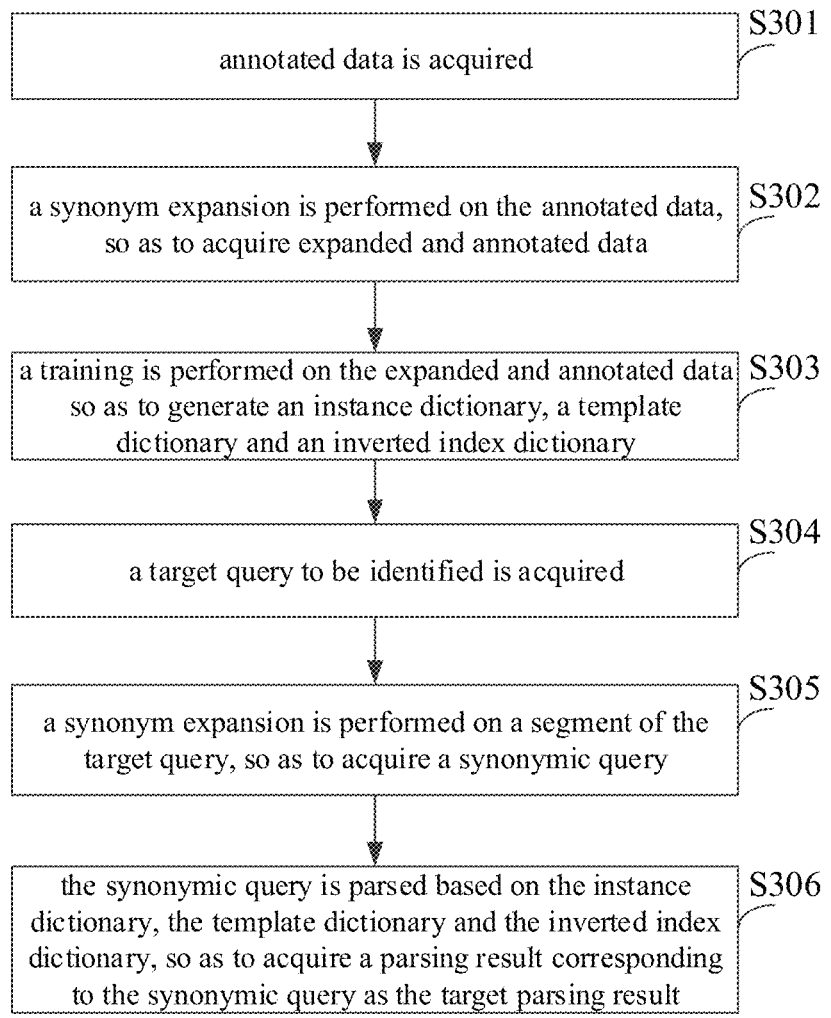
FIG. 4 is a flow chart of a method for parsing a query based on artificial intelligence according to another embodiment of the present disclosure.

FIG. 4 is a flow chart of a method for parsing a query based on artificial intelligence according to another embodiment of the present disclosure. As shown in FIG. 4, the method may include followings.

At block S301, annotated data is acquired.

Regarding the process for acquiring the annotated data, reference may be made to the description of the above embodiments, which will not be described in detail herein.

In this embodiment, the process for acquiring the annotated data may be described with reference to a case of buying a ticket to somewhere. For example:

A ticket to Shijiazhuang => END_LOC: Shijiazhuang
A ticket getting to Beijing => END_LOC: Beijing At block S302, a synonym expansion is performed on the annotated data, so as to acquire expanded and annotated data.

In order to acquire abundant annotated data to form a dictionary containing more terms, the annotated data may be expanded by using synonym terms.

For example, the term "to", "getting to" may be replaced by its synonym term such as "going to" or "heading for" etc., so as to generate the expanded and annotated data.

A ticket to Shijiazhuang => END_LOC: Shijiazhuang
A ticket getting to Beijing => END_LOC: Beijing
A ticket going to Shijiazhuang => END_LOC: Shijiazhuang
A ticket going to Beijing => END_LOC: Beijing At block S303, a training is performed on the expanded and annotated data so as to generate an instance dictionary, a template dictionary and an inverted index dictionary.

In this embodiment, after the expanded and annotated data is acquired, block S303 may be performed according to the description of block S102 and relative content in the embodiments described with reference to FIG. 2 and FIG. 3.

At block S304, a target query to be identified is acquired.

At block S305, a synonym expansion is performed on a segment of the target query, so as to acquire a synonymic query.

In order to improve a possibility of successfully parsing the target query, the synonym expansion is performed on the segment in the target query, so as to acquire the synonymic query.

At block S306, the synonymic query is parsed based on the instance dictionary, the template dictionary and the inverted index dictionary, so as to acquire a parsing result corresponding to the synonymic query as the target parsing result.

Regarding the parsing process based on the three dictionaries, reference may be made to the description in the above embodiments, which will not be described in detail herein.

When the instance dictionary is configured as the target dictionary for parsing, the target query is matched in the instance dictionary, and if a target search instance matched to the target query is found, the target parsing result may be generated according to an annotation of the target search instance.

Further, when the template dictionary is configured as the target dictionary for parsing, key information in the target query is extracted. A matching process is performed in the template dictionary according to the key information, so as to acquire a target template corresponding to the target query. The target query is parsed according to the target template, so as to acquire the target parsing result.

Figure 5:
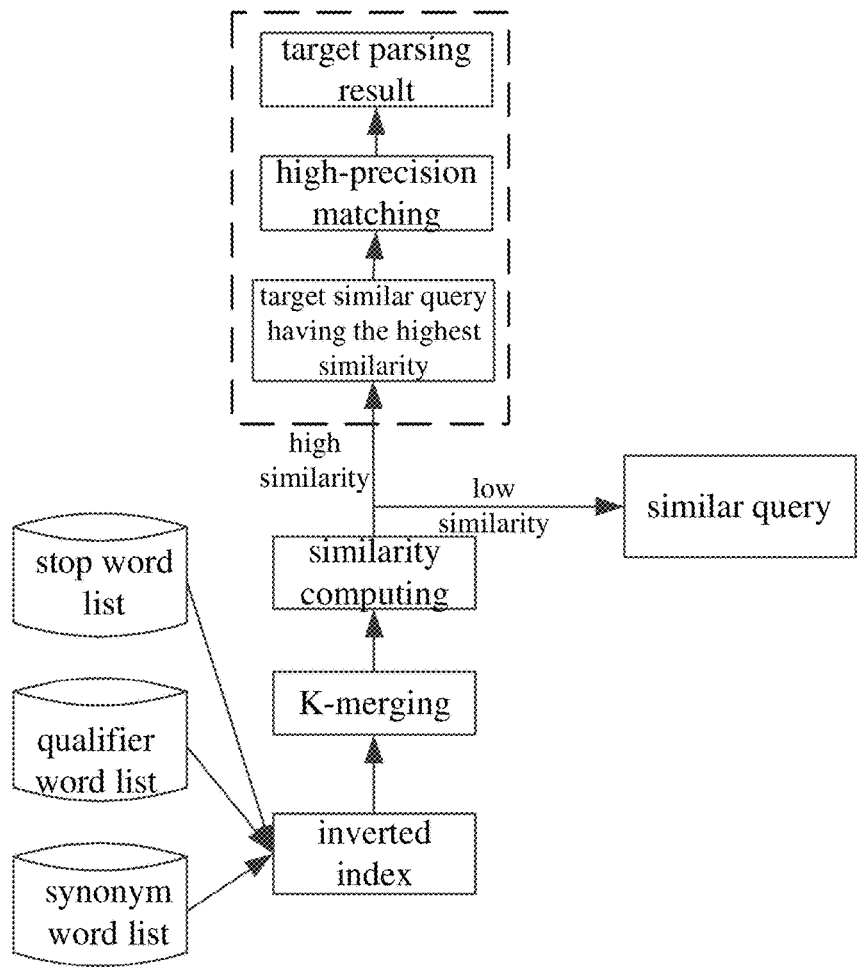
FIG. 5 is a schematic diagram of a process of parsing a query based on an inverted index dictionary according to an embodiment of the present disclosure.

Further, when the inverted index dictionary is configured as the target dictionary for parsing, the target query may be parsed based on the inverted index dictionary. FIG. 5 is a schematic diagram of a process of parsing a target query based on an inverted index dictionary according to an embodiment of the present disclosure. Firstly, a segmentation is performed on the target query so as to acquire segments of the target query. The segments are expanded in combination with a synonym word list and screened in combination with a qualifier word list and a stop word list. An inverted index searching is performed in the inverted index dictionary, so as to acquire a first candidate set of similar queries. After the first candidate set of similar queries is acquired, a screening may be performed on the first candidate set, so as to acquire a second candidate set of similar queries. Further, a target similar query may be acquired by computing similarities, and the parsing result of the target similar query may be regarded as the target parsing result. The target similar query has the highest similarity with the target query.

After the first candidate set is acquired by performing the inverted index searching, a K-merging is performed on the first candidate set of similar queries, so as to acquire covering rates of the similar queries in the first candidate set with respect to the target query respectively. After that, the first candidate set of similar queries is screened according to the covering rates, so as to acquire the second candidate set of similar queries, such that the first candidate set is optimized and the number of similar queries is reduced.

For example, the covering rates may be sorted in a descending order, a predetermined number of similar queries may be selected to form the second candidate set. For another example, similar queries each having a covering rate exceeding a preset threshold may be selected to form the second candidate set.

Further, similarities between the target query to be identified and the similar queries in the second candidate set are computed respectively, a similar query having the highest similarity with the target query is selected from the second candidate set according to the similarities as the target similar query. A similarity threshold may be set, the similar query having a similarity exceeding the similarity threshold may be determined as the target similar query. If there is no similar query having a similarity exceeding the similarity threshold, the similar query having a higher similarity among the similarities may be selected as the target similar query.

Figure 6:
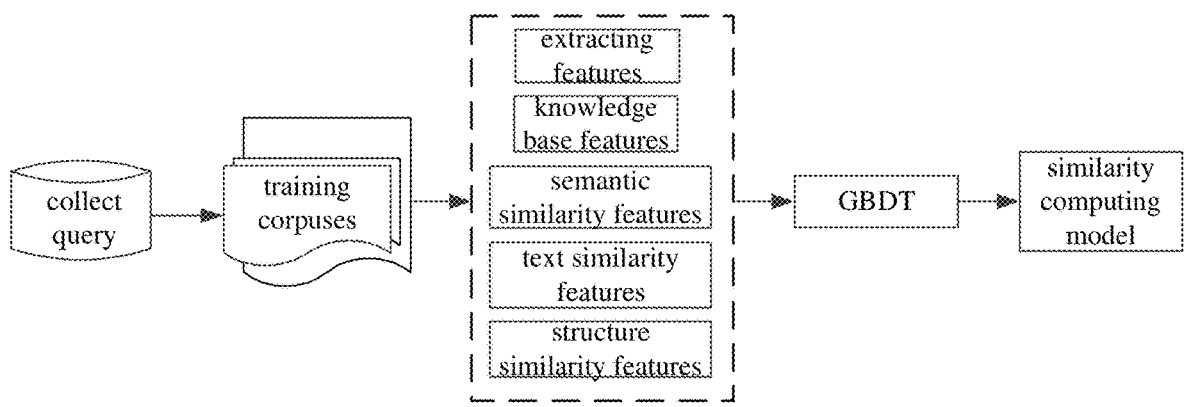
FIG. 6 is a schematic diagram of establishing a similarity computing model according to an embodiment of the present disclosure.

In this embodiment, the semantic similarities may be computed based on an established similarity computing model. FIG. 6 is a schematic diagram of establishing a similarity computing model according to an embodiment of the present disclosure. As shown in FIG. 6. The query may be collected, and training corpuses may be generated based on the collected query. Features of the training corpuses may be extracted in combination with offline resources including a synonym word list, a qualifier word list and a stop word list, so as to acquire knowledge base features, semantic similarity features, text similarity features and structure similarity features. The knowledge base features mainly include: synonym features, qualifier features, collocation features and stop word features. After these features are acquired, a gradient boosting decision tree (GBDT for short) may be used to establish the similarity computing model. After the similarity computing model is acquired, the similarities between the new query and the candidate queries may be computed based on the similarity computing model.

Figure 7:
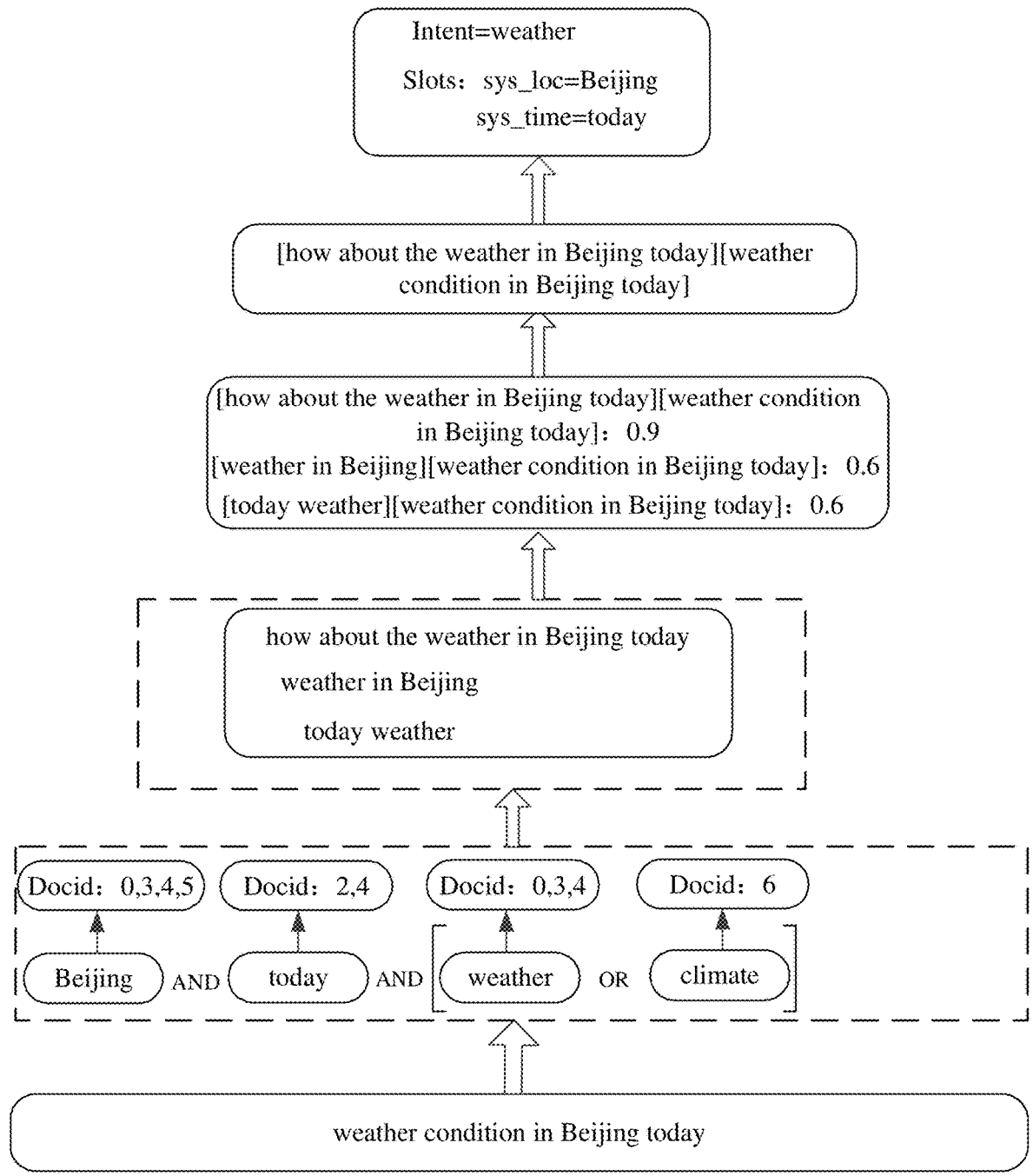
FIG. 7 is a schematic diagram of an application of parsing a query based on an inverted index dictionary according to an embodiment of the present disclosure.

For example, "weather condition in Beijing today?" may be parsed using the inverted index dictionary, and the parsing process is illustrated in FIG. 7. Segmented terms including "Beijing" AND "today" AND "weather" OR "climate" may be acquired by performing the segmentation on "weather condition in Beijing today". Identification codes of search entities each having a mapping relation with "Beijing" in the inverted index dictionary are "0, 3, 4, 5", identification codes of search entities each having a mapping relation with "today" in the inverted index dictionary are "2, 4,", identification codes of search entities each having a mapping relation with "weather" in the inverted index dictionary are "0, 3, 4", and an identification code of a search entity having a mapping relation with "climate" in the inverted index dictionary is "6". Three candidate parsing results including "how about Beijing today", "weather in Beijing" and "today's weather" may be acquired after the K-merging is performed. The similarities between the query and the candidate parsing results may be computed respectively, a similarity of [weather condition in Beijing today, how about the weather in Beijing today] is 0.9, a similarity of [weather condition in Beijing today, weather in Beijing] is 0.6, and a similarity of [weather condition in Beijing today, today's weather] is 0.6. The query "how about the weather in Beijing today" may be selected due to the highest similarity, such that it may be determined that the target parsing result is "intent=weather, Slots: sys_loc=Beijing, sys_time=today".

This embodiment will be described in detail in a case of buying a ticket.

| | |
|---|---|
| Annotated data: | A ticket to Shijiazhuang => END_LOC: Shijiazhuang |
| | A ticket getting to Beijing => END_LOC: Beijing |
| Instance dictionary: | A ticket to Shijiazhuang => END_LOC: Shijiazhuang |
| | A ticket getting to Beijing => END_LOC: Beijing |

An online identification may be performed on the target query using the instance dictionary:

Target query to be parsed: A ticket to Shijiazhuang => END_LOC: Shijiazhuang
Target query to be parsed: A ticket getting to Beijing => END_LOC: Beijing
Target query to be parsed: A ticket to Beijing => unidentifiable
Target query to be parsed: A ticket getting to Shijiazhuang => unidentifiable It can be seen that the instance dictionary may come into effect in a one-to-one corresponding manner. Corresponding result can be found only when the query to be identified is exactly matched to the search instance annotated by the user, while when using the key information annotated by the user, it is unable to realize automatic annotating by automatic context expansion.

When the template dictionary is configured as the target dictionary for parsing, since the template dictionary has generalization ability, the correspondence between key information in the query and other concrete terms may be realized automatically by using the search instance and concrete terms annotated by the user.

The target query may be identified online by using the template dictionary:

| | |
|---|---|
| Annotated data: | A ticket to Shijiazhuang => END_LOC: Shijiazhuang |
| | A ticket getting to Beijing => END_LOC: Beijing |
| Template dictionary: | A ticket to [END_LOC] |
| | A ticket getting to [END_LOC] |

An online identification may be performed on the target query using the template dictionary:

Target query to be parsed: A ticket to Beijing => END_LOC: Beijing
Target query to be parsed: A ticket getting to Shijiazhuang => END_LOC: Shijiazhuang When the inverted index dictionary is configured as the target dictionary for parsing, since the inverted index dictionary has strong generalization ability, several candidate parsing results may be acquired for the target query to be identified.

```
Annotated data: A ticket to Shijiazhuang => END_LOC:
                    Shijiazhuang
                A ticket getting to Beijing => END_LOC: Beijing
Inverted index dictionary: Beijing => a ticket getting to Beijing,
                    END_LOC: Beijing
                ticket => a ticket getting to Beijing, END_LOC:
Beijing and a ticket to Shijiazhaung, END_LOC: Shijiazhaung
```

The target query may be identified online by using the inverted index dictionary:

Target query to be parsed: A ticket to Beijing

```
Beijing => a ticket getting to Beijing, END_LOC: Beijing
    ticket => a ticket getting to Beijing, END_LOC: Beijing and a ticket
to Shijiazhaung, END_LOC: Shijiazhaung
```

Finally, "END_LOC: Beijing" may be identified as the target parsing result.

Figure 8:
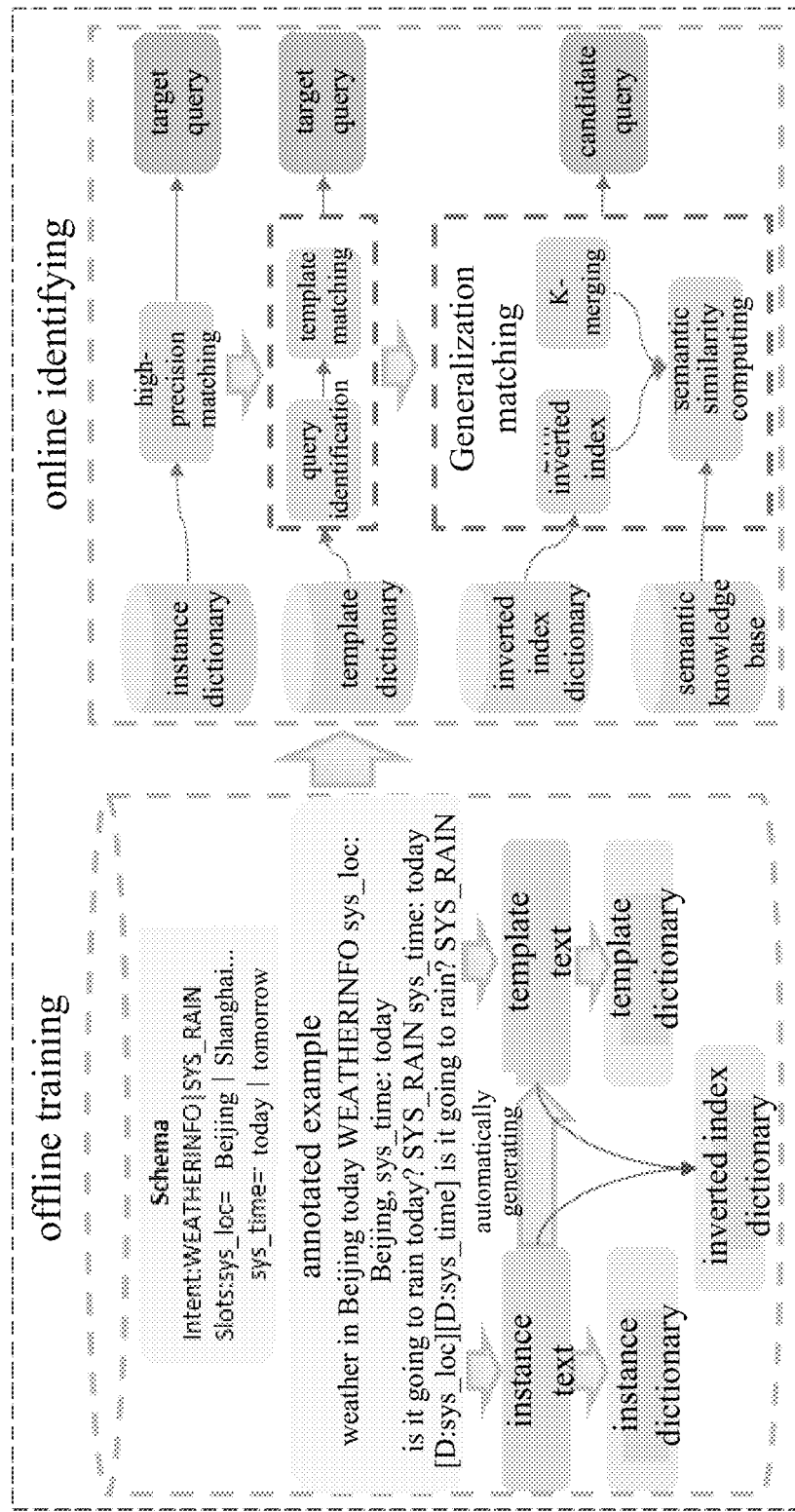
FIG. 8 is a schematic diagram of an application of a method for parsing a query based on artificial intelligence according to an embodiment of the present disclosure.

Take a case of weather checking as an example. FIG. 8 is a schematic diagram of an application of a method for parsing a query based on artificial intelligence according to an embodiment of the present disclosure. As shown in FIG. 8, the method for parsing a query based on artificial intelligence may include an offline training process and an online identifying process.

In the offline training process, following annotated data may be acquired.

```
Schema
Intent : WEATHERINFO|SYS_RAIN
Slots : sys_loc=Beijing|Shanghai......
        sys_time=today|tomorrow
```

Annotated instance:

weather in Beijing today; WEATHERINFO sys_loc: Beijing, sys_time: today is it going to rain today? SYS_RAIN sys_time: today

[D: sys_loc][D: sys_time] is it going to rain? SYS_RAIN

It should be noted that WEATHERINFO represents a field, SYS_RAIN represents a category in the field, sys_loc and sys_time are attributes of terms, Beijing|Shanghai represent concrete terms under the attribute "sys_loc", today-|tomorrow represent concrete terms under the attribute "sys_time". "weather in Beijing today; WEATHERINFO sys_loc: Beijing, sys_time: today" and "is it going to rain today? SYS_RAIN sys_time: today" refer to annotated search instances, "[D: sys_loc][D: sys_time] is it going to rain? SYS_RAIN" is an annotated template instance.

Further, a standard search instance is regarded as the instance data, and a standard template instance is regarded as the template data. The instance dictionary may be acquired based on the instance data, the template dictionary may be acquired based on the template data, and the inverted index dictionary may be acquired based on the template data and the instance data.

After the three dictionaries are acquired, an online parsing may be performed on the target query using the three dictionaries. FIG. 8 illustrates the specific process of the online parsing. According to the priorities of the three dictionaries, the target parsing results may be acquired via a high-precision matching based on the instance dictionary, via a template matching based on the template dictionary, and via a generalization matching based on the inverted index dictionary. Regarding the specific process, reference may be made to the above description, which will not be described in detail herein.

Figure 9:
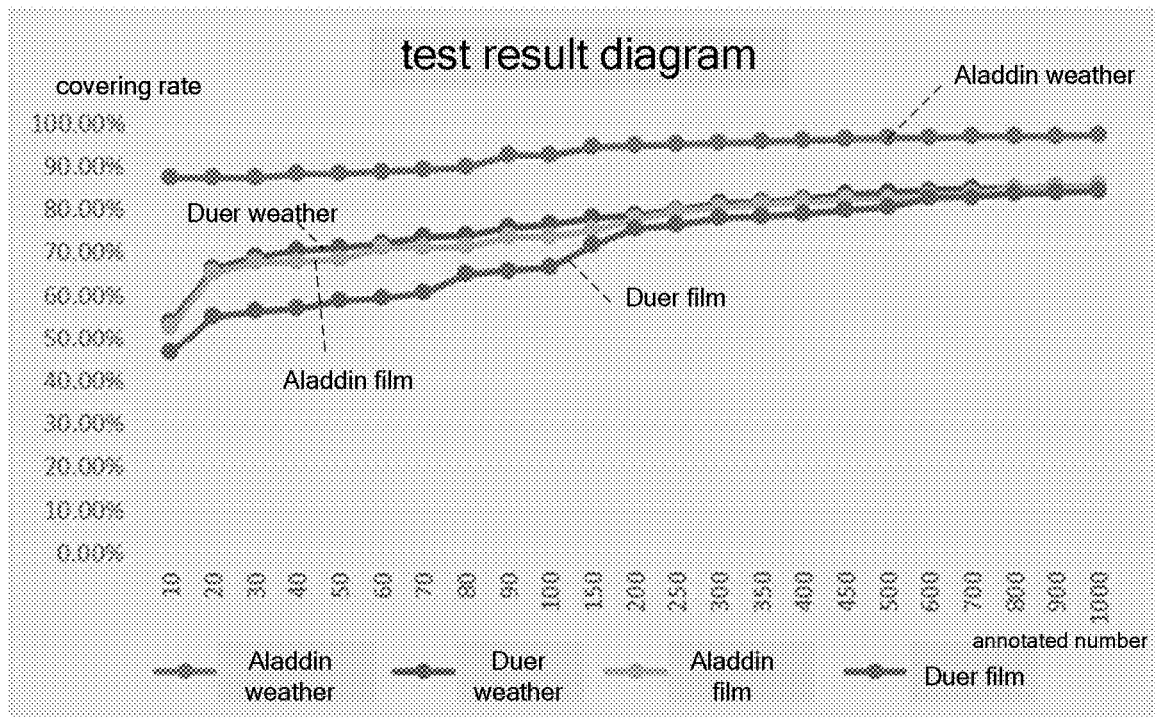
FIG. 9 is a schematic diagram illustrating a test result of a method for parsing a query based on artificial intelligence according to an embodiment of the present disclosure.

With the method for parsing a query based on artificial intelligence illustrated with reference to FIG. 8, a test may be performed on the covering rates of parsing results obtained based on queries in different categories input by the user. The queries to be tested refer to "Aladdin weather", "Duer weather", "Aladdin film" and "Duer film". In a case that the number of the manually annotated data is smaller than or equal to 10, the covering rate may reach to 45%-75%. For some categories having a low colloquial level (i.e., for some terms which may not be generally used in daily expression), in a case that the number of the manually annotated data is 10, the covering rate is close to 90%. The specific effect is illustrated in FIG. 9.

Figure 10:
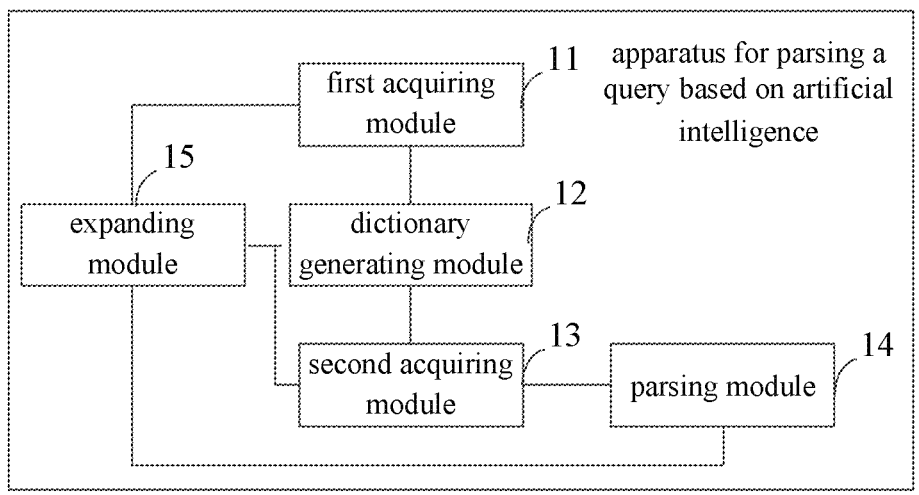
FIG. 10 is a block diagram of an apparatus for parsing a query based on artificial intelligence according to an embodiment of the present disclosure.

FIG. 10 is a block diagram of an apparatus for parsing a query based on artificial intelligence according to an embodiment of the present disclosure. Referring to FIG. 10, the apparatus may include: a first acquiring module 11, a dictionary generating module 12, a second acquiring module 13 and a parsing module 14.

The first acquiring module 11 is configured to acquire annotated data including an annotated search instance, an annotated template instance, a field of a search intent and a category in the field, an attribute of a term in the annotated search instance and a concrete term included in the attribute of the term.

The dictionary generating module 12 is configured to perform a training on the annotated data so as to generate an instance dictionary, a template dictionary and an inverted index dictionary, in which the instance dictionary includes the annotated search instance and an annotation of the annotated search instance, the template dictionary includes a combination of the field, the category and/or the attribute of the term, and the inverted index dictionary includes a corresponding relation between a segmented term and the annotated search instance.

The second acquiring module 13 is configured to acquire a target query to be identified.

The parsing module 14 is configured to parse the target query based on the instance dictionary, the template dictionary and the inverted index dictionary, so as to acquire a target parsing result corresponding to the target query.

Further, the dictionary generating module 12 is configured to: extract the annotated search instance from the annotated data as instance data; perform an abstraction on key information in the annotated search instance, acquire an attribute of the key information in the annotated search instance and the field corresponding to the annotated search instance, and combine the attribute of the key information, the field corresponding to the annotated search instance and/or the category in the field to generate template data; perform a structural processing on the instance data to generate the instance dictionary; perform a structural processing on the template data to generate the template dictionary; and perform an inverted index processing on the instance data and the template data to generate the inverted index dictionary.

Further, the parsing module 14 is configured to: parse the target query successively using the instance dictionary, the template dictionary and the inverted index dictionary according to priorities of the instance dictionary, the template dictionary and the inverted index dictionary; and stop parsing when the target parsing result is acquired by using one of the instance dictionary, the template dictionary and the inverted index dictionary.

Further, when the instance dictionary is used to parse the target query, the parsing module 14 is configured to: match the target query in the instance dictionary; and if a target search instance matched to the target query is found, generate the target parsing result according to an annotation of the target search instance.

Further, when the template dictionary is used to parse the target query, the parsing module 14 is configured to: extract key information in the target query; match in the template dictionary according to the key information, so as to acquire a target template corresponding to the target query; and parse the target query according to the target template, so as to acquire the target parsing result.

Further, when the inverted index dictionary is used to parse the target query, the parsing module 14 is configured to: perform a segmentation on the target query to obtain a first segmented term; perform an inverted index searching in the inverted index dictionary according to the first segmented term, so as to acquire a first candidate set of similar queries; perform a K-merging on the first candidate set of similar queries, so as to acquire covering rates of the similar queries in the first candidate set with respect to the target query respectively, and screen the similar queries in the first candidate set according to the covering rates, so as to acquire a second candidate set of similar queries; compute similarities between the target query and the similar queries in the second candidate set respectively; and select a target similar query having a highest similarity with the target query from the second candidate set according to the similarities, and determine a parsing result corresponding to the target similar query as the target parsing result.

Further, the apparatus also includes an expanding module 15, configured to perform a synonym expansion on the annotated data or the target query.

With the apparatus for parsing the query based on artificial intelligence according to the embodiments of the present disclosure, by acquiring the annotated data and performing an off-line training on the annotated data, the instance dictionary, the template dictionary and the inverted index dictionary are generated for parsing the query. During the parsing on the query, it only needs to depend on the three dictionaries without professional experiences, such that the query may be parsed automatically. And the parsing depending on such three dictionaries is an overall parsing, thereby avoiding a problem of data losing. As all the three dictionaries may provide the parsing result of the query, the three dictionaries may be used successively to parse the query to acquire the parsing result, such that a possibility of identifying the query may be improved.

Figure 11:
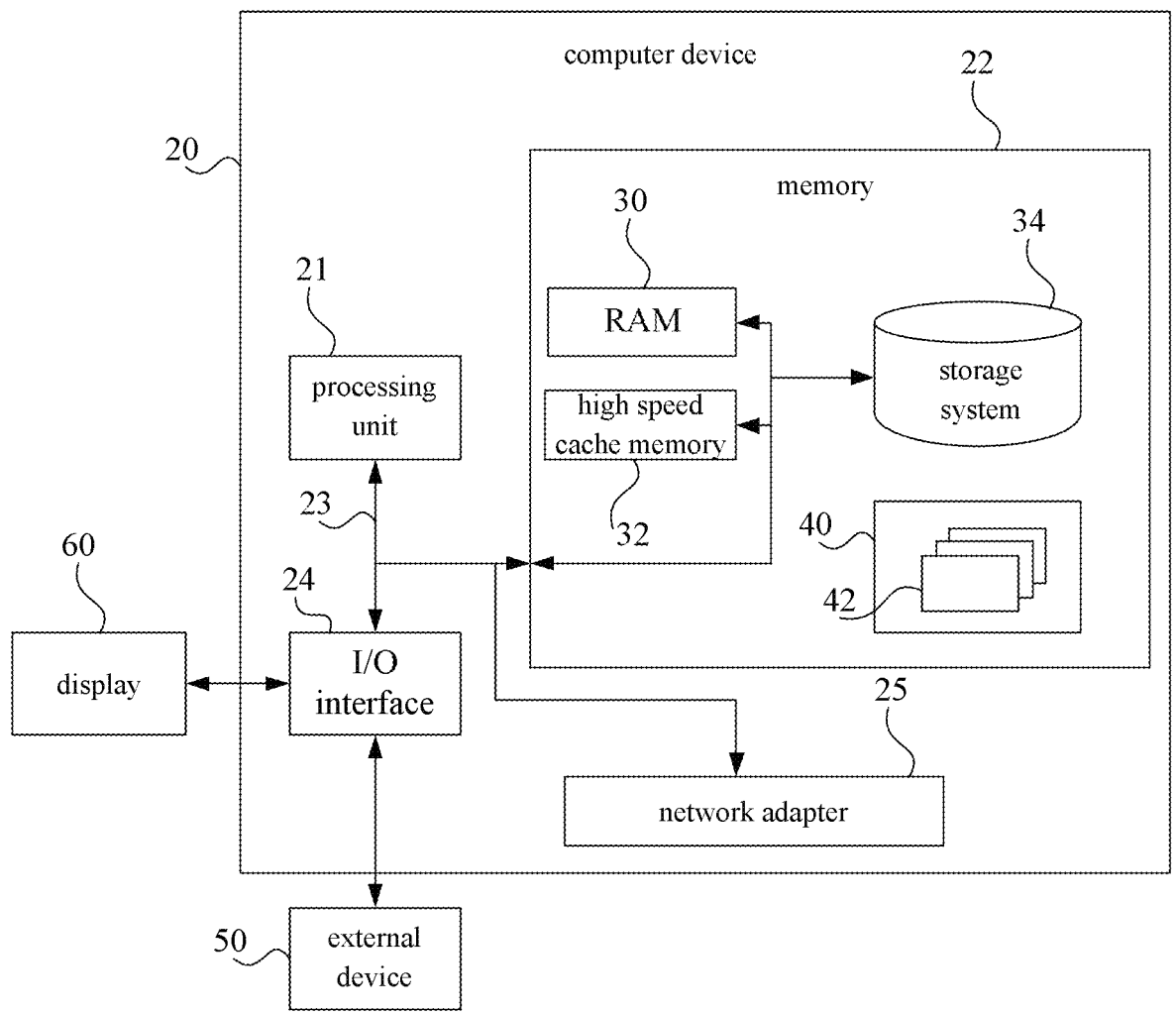
FIG. 11 is a structure diagram of a computer device according to an embodiment of the present disclosure.

FIG. 11 is a structure diagram of a computer device 20 according to an embodiment of the present disclosure. The computer device 20 illustrated in FIG. 11 is merely an example, which should be not understood to limit the functions and usage scope of embodiments of the present disclosure.

As illustrated in FIG. 11, the computer device 20 may be represented in a form of a general-purpose computing device. Components of the computer device 20 may include but are not limited to one or more processors or processing units 21, a system memory 22, a bus 23 connecting various system components including the system memory 22 and the processing units 21.

The bus 23 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 20 typically includes a variety of computer system readable media. These media may be any available media accessible by the computer device 20 and includes both volatile and non-volatile media, removable and non-removable media.

The system memory 22 may include a computer system readable medium in the form of volatile memory, such as a random access memory (hereinafter referred to as RAM) 30 and/or a high speed cache memory 32. The computer device 20 may further include other removable or non-removable, volatile or non-volatile computer system storage media. By way of example only, the storage system 34 may be configured to read and write a non-removable and non-volatile magnetic media (not shown in FIG. 11, commonly referred to as a "hard drive"). Although not shown in FIG. 11, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), Digital Video Disc Read Only Memory (hereinafter referred to as DVD-ROM) or other optical media can be provided. In these cases, each driver may be connected to the bus 23 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 20 may also communicate with one or more external devices 50 (such as, a keyboard, a pointing device, a display 60, etc.). Furthermore, the computer device 20 may also communicate with one or more devices enabling a user to interact with the computer device 20 and/or other devices (such as a network card, modem, etc.) enabling the computer device 20 to communicate with one or more computer devices. This communication can be performed via the input/output (I/O) interface 24. Also, the computer device 20 may communicate with one or more networks (such as a local area network (hereafter referred to as LAN), a wide area network (hereafter referred to as WAN) and/or a public network such as an Internet) through a network adapter 25. As shown in FIG. 11, the network adapter 25 communicates with other modules of the computer device 20 over the bus 23. It should be understood that, although not shown in FIG. 11, other hardware and/or software modules may be used in connection with the computer device 20. The hardware and/or software includes, but is not limited to, microcode, device drivers, redundant processing units, external disk drive arrays, RAID systems, Drive and data backup storage system.

The processing unit 21 is configured to execute various functional applications and data processing by running programs stored in the system memory 22, for example, implementing the method for parsing a query based on artificial intelligence provided in embodiments of the present disclosure.

Any combination of one or more computer readable medium(s) may be utilized. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by or in connection with an instruction executed system, apparatus or device.

The computer readable signal medium may include a data signal propagating in baseband or as part of a carrier wave which carries a computer readable program code. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport a program used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In order to achieve the above objectives, embodiments of the present disclosure provide a computer program product, when instructions in the computer program product are executed, the method for parsing a query based on artificial intelligence according to the above mentioned embodiments of the present disclosure is performed.

In order to achieve the above objectives, embodiments of the present disclosure provide a non-transitory computer readable storage medium storing computer programs, when the computer programs are executed, the method for parsing a query based on artificial intelligence according to the above mentioned embodiments of the present disclosure is performed.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

It should be illustrated that, in descriptions of the present disclosure, terms such as "first" and "second" are used herein for purposes of description and are not construed as indicating or implying relative importance or significance. Furthermore, in the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for parsing a query based on artificial intelligence, comprising:
    acquiring annotated data comprising an annotated search instance, an annotated template instance, a field of a search intent corresponding to the annotated search instance and a category in the field, an attribute of a term in the annotated search instance and a concrete term comprised in the attribute of the term;
    performing a training on the annotated data so as to generate an instance dictionary, a template dictionary and an inverted index dictionary, wherein the instance dictionary comprises the annotated search instance and an annotation of the annotated search instance, the template dictionary comprises a combination of the field, the category and/or the attribute of the term, and the inverted index dictionary comprises a corresponding relation between a segmented term and the annotated search instance;
    acquiring a target query to be identified; and
    parsing the target query based on the instance dictionary, the template dictionary and the inverted index dictionary, so as to acquire a target parsing result corresponding to the target query;
    wherein performing the training on the annotated data so as to generate the instance dictionary, the template dictionary and the inverted index dictionary comprises:
    extracting the annotated search instance from the annotated data as instance data;
    performing an abstraction on key information in the annotated search instance, acquiring an attribute of the key information in the annotated search instance and the field corresponding to the annotated search instance, and combining the attribute of the key information, the field corresponding to the annotated search instance and/or the category in the field to generate template data;
    performing a structural processing on the instance data to generate the instance dictionary;
    performing a structural processing on the template data to generate the template dictionary; and
    performing an inverted index processing on the instance data and the template data to generate the inverted index dictionary.

2. The method according to claim 1, wherein parsing the target query based on the instance dictionary, the template dictionary and the inverted index dictionary, so as to acquire the target parsing result corresponding to the target query comprises:
    parsing the target query successively using the instance dictionary, the template dictionary and the inverted index dictionary according to priorities of the instance dictionary, the template dictionary and the inverted index dictionary; and
    stopping parsing when the target parsing result is acquired by using one of the instance dictionary, the template dictionary and the inverted index dictionary.

3. The method according to claim 2, wherein when the instance dictionary is used to parse the target query, the method further comprises:
    matching the target query in the instance dictionary; and
    if a target search instance matched to the target query is found, generating the target parsing result according to an annotation of the target search instance.

4. The method according to claim 2, wherein when the template dictionary is used to parse the target query, the method further comprises:
    extracting key information in the target query;
    matching in the template dictionary according to the key information, so as to acquire a target template corresponding to the target query; and
    parsing the target query according to the target template, so as to acquire the target parsing result.

5. The method according to claim 2, wherein when the inverted index dictionary is used to parse the target query, the method further comprises:
    performing a segmentation on the target query to obtain a first segmented term;
    performing an inverted index searching in the inverted index dictionary according to the first segmented term, so as to acquire a first candidate set of similar queries;
    performing a K-merging on the first candidate set of similar queries, so as to acquire covering rates of the similar queries in the first candidate set with respect to the target query respectively, and screening the similar queries in the first candidate set according to the covering rates, so as to acquire a second candidate set of similar queries;
    computing similarities between the target query and the similar queries in the second candidate set respectively; and selecting a target similar query having a highest similarity with the target query from the second candidate set according to the similarities, and determining a parsing result corresponding to the target similar query as the target parsing result.

6. The method according to claim 5, further comprising:
establishing a similarity computing model;
wherein, computing similarities between the target query and the similar queries in the second candidate set respectively comprises:
computing similarities between the target query and the similar queries in the second candidate set respectively based the similarity computing model.

7. The method according to claim 6, wherein establishing the similarity computing model comprises:
collecting queries;
generating training corpuses based on the queries collected;
performing a feature extraction on the training corpuses in combination a synonym word list, a qualifier word list and a stop word list, so as to obtain knowledge base features, semantic similarity features, text similarity features and structure similarity features;
generating the similarity computing model by using a gradient boosting decision tree, based on the knowledge base features, the semantic similarity features, the text similarity features and the structure similarity features.

8. The method according to claim 1, further comprising:
performing a synonym expansion on the annotated data or the target query.

9. The method according to claim 1, further comprising:
performing a synonym expansion on the annotated data or the target query.

10. A computer device, comprising:
a processor; and
a memory configured to store executable program codes;
wherein,
the processor is configured to run a program corresponding to the executable program codes by reading the executable program codes stored in the memory, so as to execute acts of:
acquiring annotated data comprising an annotated search instance, an annotated template instance, a field of a search intent corresponding to the annotated search instance and a category in the field, an attribute of a term in the annotated search instance and a concrete term comprised in the attribute of the term;
performing a training on the annotated data so as to generate an instance dictionary, a template dictionary and an inverted index dictionary, wherein the instance dictionary comprises the annotated search instance and an annotation of the annotated search instance, the template dictionary comprises a combination of the field, the category and/or the attribute of the term, and the inverted index dictionary comprises a corresponding relation between a segmented term and the annotated search instance;
acquiring a target query to be identified; and
parsing the target query based on the instance dictionary, the template dictionary and the inverted index dictionary, so as to acquire a target parsing result corresponding to the target query;
wherein the processor is configured to perform the training on the annotated data so as to generate the instance dictionary, the template dictionary and the inverted index dictionary by:

extracting the annotated search instance from the annotated data as instance data;
performing an abstraction on key information in the annotated search instance, acquiring an attribute of the key information in the annotated search instance and the field corresponding to the annotated search instance, and combining the attribute of the key information, the field corresponding to the annotated search instance and/or the category in the field to generate template data;
performing a structural processing on the instance data to generate the instance dictionary;
performing a structural processing on the template data to generate the template dictionary; and
performing an inverted index processing on the instance data and the template data to generate the inverted index dictionary.

11. The computer device according to claim 10, wherein the processor is configured to parse the target query based on the instance dictionary, the template dictionary and the inverted index dictionary, so as to acquire the target parsing result corresponding to the target query by:
parsing the target query successively using the instance dictionary, the template dictionary and the inverted index dictionary according to priorities of the instance dictionary, the template dictionary and the inverted index dictionary; and
stopping parsing when the target parsing result is acquired by using one of the instance dictionary, the template dictionary and the inverted index dictionary.

12. The computer device according to claim 11, wherein when the instance dictionary is used to parse the target query, the processor is further configured to:
match the target query in the instance dictionary; and
if a target search instance matched to the target query is found, generate the target parsing result according to an annotation of the target search instance.

13. The computer device according to claim 11, wherein when the template dictionary is used to parse the target query, the processor is further configured to:
extract key information in the target query;
match in the template dictionary according to the key information, so as to acquire a target template corresponding to the target query; and
parse the target query according to the target template, so as to acquire the target parsing result.

14. The computer device according to claim 11, wherein when the inverted index dictionary is used to parse the target query, the processor is further configured to:
perform a segmentation on the target query to obtain a first segmented term;
perform an inverted index searching in the inverted index dictionary according to the first segmented term, so as to acquire a first candidate set of similar queries;
perform a K-merging on the first candidate set of similar queries, so as to acquire covering rates of the similar queries in the first candidate set with respect to the target query respectively, and screen the similar queries in the first candidate set according to the covering rates, so as to acquire a second candidate set of similar queries;
compute similarities between the target query and the similar queries in the second candidate set respectively; and
select a target similar query having a highest similarity with the target query from the second candidate set according to the similarities, and determine a parsing result corresponding to the target similar query as the target parsing result.

15. The computer device according to claim 14, wherein the processor is further configured to:
    establish a similarity computing model;
    wherein, the processor is configured to compute similarities between the target query and the similar queries in the second candidate set respectively by:
    computing similarities between the target query and the similar queries in the second candidate set respectively based the similarity computing model.

16. The computer device according to claim 15, wherein the processor is further configured to establish the similarity computing model by:
    collecting queries;
    generating training corpuses based on the queries collected;
    performing a feature extraction on the training corpuses in combination a synonym word list, a qualifier word list and a stop word list, so as to obtain knowledge base features, semantic similarity features, text similarity features and structure similarity features;
    generating the similarity computing model by using a gradient boosting decision tree, based on the knowledge base features, the semantic similarity features, the text similarity features and the structure similarity features.

17. The computer device according to claim 10, wherein the processor is further configured to:
    perform a synonym expansion on the annotated data or the target query.

18. A computer program product, wherein when instructions in the computer program product are executed, the method including:
    acquiring annotated data comprising an annotated search instance, an annotated template instance, a field of a search intent corresponding to the annotated search instance and a category in the field, an attribute of a term in the annotated search instance and a concrete term comprised in the attribute of the term;
    performing a training on the annotated data so as to generate an instance dictionary, a template dictionary and an inverted index dictionary, wherein the instance dictionary comprises the annotated search instance and an annotation of the annotated search instance, the template dictionary comprises a combination of the field, the category and/or the attribute of the term, and the inverted index dictionary comprises a corresponding relation between a segmented term and the annotated search instance;
    acquiring a target query to be identified; and
    parsing the target query based on the instance dictionary, the template dictionary and the inverted index dictionary, so as to acquire a target parsing result corresponding to the target query;
    wherein performing the training on the annotated data so as to generate the instance dictionary, the template dictionary and the inverted index dictionary comprises:
    extracting the annotated search instance from the annotated data as instance data;
    performing an abstraction on key information in the annotated search instance, acquiring an attribute of the key information in the annotated search instance and the field corresponding to the annotated search instance, and combining the attribute of the key information, the field corresponding to the annotated search instance and/or the category in the field to generate template data;
    performing a structural processing on the instance data to generate the instance dictionary;
    performing a structural processing on the template data to generate the template dictionary; and
    performing an inverted index processing on the instance data and the template data to generate the inverted index dictionary.

\* \* \* \* \*